United States Patent [19]

Komurasaki et al.

[11] Patent Number: 4,755,734
[45] Date of Patent: Jul. 5, 1988

[54] VOLTAGE REGULATOR FOR VEHICLE MOUNTED GENERATOR

[75] Inventors: Keiichi Komurasaki; Shiro Iwatani, both of Hyogo, Japan

[73] Assignee: Mitsubishi Denki Kabushiki Kaisha, Tokyo, Japan

[21] Appl. No.: 923,996

[22] Filed: Oct. 28, 1986

[30] Foreign Application Priority Data

Oct. 29, 1985 [JP] Japan .............................. 60-244543

[51] Int. Cl.4 .............................................. H02P 9/00
[52] U.S. Cl. ...................................... 322/28; 322/99; 320/64
[58] Field of Search ...................... 322/28, 99; 320/64

[56] References Cited

U.S. PATENT DOCUMENTS

| | | | |
|---|---|---|---|
| 3,492,559 | 1/1970 | Harris | 322/99 |
| 4,143,313 | 3/1979 | Arendt | 322/99 |
| 4,262,243 | 4/1981 | Mori et al. | 322/99 |
| 4,280,087 | 7/1981 | Kasiewicz | 322/99 |

Primary Examiner—Patrick R. Salce
Assistant Examiner—Anita M. Ault
Attorney, Agent, or Firm—Sughrue, Mion, Zinn, Macpeak and Seas

[57] ABSTRACT

The field current of a vehicle mounted generator is controlled by a first detecting device 301, 302 for detecting a voltage of a battery to be charged by the generator with a first reference level, when a connection of the first detecting device to the battery is complete, and by a second detecting device 303, 304 for detecting the output voltage of the generator with a second reference level which is substantially the same as the first reference level, when the connection is broken.

4 Claims, 3 Drawing Sheets

VOLTAGE REGULATOR FOR VEHICLE MOUNTED GENERATOR

BACKGROUND OF THE INVENTION

The present invention relates to a voltage regulator for a vehicle mounted generator having a rectifier and, particularly, to such regulator for regulating an output voltage of the rectifier of the generator.

FIG. 1 is a circuit diagram of a conventional voltage regulation system for a vehicle mounted generator in which a generator 1 is composed of an armature winding 101 and a field winding 102. A rectifier 2 includes a main rectifier portion having an output terminal 201 for providing a main d.c. voltage obtained by a fullwave rectification of an output a.c. voltage of the generator 1 and an auxiliary rectifier portion having an output terminal 202 for energizing the field winding 102 as well as detecting an output voltage of the generator 1. The rectifier 2 further includes an output terminal 203 which is grounded. The voltage regulator 3 includes a series connected resistors 301 and 302 which form a voltage divider for dividing a voltage at a positive terminals of a battery 4 and responds to a fraction of the battery voltage to regulate the output voltage of the main rectifier portion of the rectifier 2 and hence the output voltage of the generator 1 to a predetermined value. The regulator 3 further includes series connected resistors 303 and 304 which form a second voltage divider for dividing the voltage at the output terminal 202 of the rectifier 2 to detect the output voltage of the generator 1, similarly.

An input transistor 308 of the regulator 3 has a base connected through a reverse current blocking diode 305 and a Zener diode 307 to a dividing point of the voltage divider 301, 302 and through the Zener diode 307 and a reverse current blocking diode 306 to a dividing point of the voltage divider 303, 304. The Zener diode 307 detects the voltage at the dividing point of either of the voltage dividers and turns on when the voltage exceeds a pre-set value. The input transistor 308 is turned on when the Zener diode 307 is turned on.

The regulator 3 further includes an output transistor 309 having a base connected to a collector of the input transistor 308 and through a resistor 310 to the output terminal 202 of the rectifier 2, a collector connected to one of terminal of the field winding 102 and through a reverse current blocking diode 311 to the terminal 202 of the rectifier 2, and an emitter connected to an emitter of the input transistor 308 which is grounded.

The output transistor 309 is turned on and off under control of the input transistors 308 to on-off control the field winding 102. The transistors 308 and 309 and the Zener diode 307 constitute switching means for the on-off control of the field current according to the voltages detected by the voltage dividers. The reverse current blocking diode 311 serves to absorb on-off surges produced in the field winding 102.

A load 5 is connected to the positive terminal of the battery 4, which is connected to the output terminal 201 of the rectifier 2, and through a key switch 6, a resistor 7 and a reverse current blocking diode 8 to the output terminal 202 of the rectifier 2 for the initial energization of the field winding 102.

In operation, when the key switch 6 is closed to start the vehicle engine, an initial energizing current flows from the battery 4 through the key switch 6, the resistor 7 and the diode 8 to the field winding 102 to make the generator 1 ready for operation.

Then, when the engine starts, the generator 1 commences its operation to supply an a.c. output which is rectified by the rectifier 2 and supplied to the battery 4 to charge the latter and to the electric load 5.

The voltage regulator 3 responds to the voltage at terminal S of the battery 4 to regulate the voltage to a predetermined value. That is, when the terminal voltage exceeds the predetermined voltage which is detected by the voltage divider composed of the resistors 301 and 302 and the Zener diode 307, the diode 307 is turned on to thereby turn the input transistor 308 on which, in turn, turns the output transistor 309 off. Upon the cut-off of the latter transistor, field current no longer flows through the field winding 102, resulting in no output power generated by the generator 1.

When the generator 1 stops its power generation, the voltage at terminal S of the battery 4 is gradually lowered and therefore the voltage at the junction of the resistors 301 and 302 is also lowered gradually.

When the output voltage of the voltage divider is lowered below the preset value, the Zener diode 307 is turned off to turn the output transistor 309 on and to connect the field winding 102 in circuit, resulting in an increase of the output voltage of the generator 1. The terminal voltage of the battery 4 is regulated at a constant value by repetition of the above mentioned operations.

When the connection of the regulator 3 to terminal S of the battery 4 is broken due to incorrect mountings or abnormal shock or vibration of the vehicle, however, the voltage across the voltage divider composed of the resistors 301 and 302 becomes zero and thus the transistor 309 continues to conduct. Therefore, the generator 1 tends to run without control of the regulator, while the voltage divider composed of the resistors 303 and 304 is still applied with the output voltage at the output terminal 202 of the rectifier 2. When the output voltage at the terminal 202 exceeds a second preset value which is determined by the resistors 303 and 304 and the Zener diode 307, the latter diode is turned on and, when the voltage is lowered below the second preset value, the diode 307 is turned off. The operations are repeated so that the output voltage of the generator 1 is regulated to a constant value even when the voltage regulator 3 is disconnected from the detection terminal S.

As mentioned above, when the connection of the voltage regulator 3 to the detection terminals is broken, the voltage detection criteria is switched from that for the battery voltage to that for the output voltage of the rectifier 2 of the generator 1, and the voltage dividers and the Zener diode thus constitute a protection circuit against the case of breakage of the connection of the regulator to the detection terminal S.

The first preset value and the second preset value are preferably selected identical or at least substantially equal to each other to prevent the overcharging of the battery and to accommodate the durations of various electric loads of the vehicle.

However, when the electric load of the vehicle is increased, the output current of the generator 1 increases correspondingly, resulting in an increased voltage drop along the main wiring 9 and in a higher output terminal voltage of the generator than the terminal voltage of the battery.

Peaks of a ripple contained in the output voltage of the generator may be absorbed by the so-called capacitance effect on the battery side. However, on the generator side, the ripple which contains relatively high peaks is supplied from the output terminal 202 of the rectifier 2 to the voltage divider composed of the resistors 303 and 304.

For these reasons, when the values of the first and second preset voltages are not selected the same or substantially the same, the regulator operates in accordance with the highest one of them. Therefore, during a normal operation of the generator having a heavy load, the regulator always operates on the basis of the output voltage of the rectifier, which makes the regulation of the battery charging voltage to a constant value impossible. Consequently, in the conventional system, the second preset value is usually set at a value higher by about 1.5 volts to about 2.0 volts than the first preset value which is the battery detection voltage, in order to keep the battery charging voltage constant regardless of the load condition of the generator during normal operation.

In a system having the first and second preset values selected as above, when the regulator is disconnected from the detection terminal S of the battery, the latter and other electric loads of the vehicle are applied with the second preset voltage which is higher than the battery detection voltage. Therefore, the battery tends to be overcharged, resulting in a shortened life thereof, and the power consumption of the other electric loads increases.

U.S. Pat. No. 3,942,097 discloses a voltage regulating system in which a single voltage divider is used for detecting both the battery voltage and the rectifier output voltage. In this system, the voltage divider comprises a pair of resistors connected in series through a Zener diode having a cathode connected through a resistor to a collector of an input transistor whose base is connected through a resistor to a detection terminal of a battery. The collector of the input transistor is connected to a base of a transistor having a collector-emitter circuit connected to an alarm lamp. When a connection of the base of the input transistor to the battery through the base resistor is broken, the lamp is lit by a current flowing through the collector-emitter circuit of the transistor to indicate the disconnection.

The rectifier output voltage is applied to the divider through a couple of series connected diodes which act as a compensating circuit for making a voltage to be applied from the rectifier across the divider as close to that to be applied from the battery as possible. That is, the compensating circuit has to be employed due to the fact that the rectifier output voltage becomes much higher than the battery voltage.

However, it is very difficult practically to select a composite resistance value of the pluraity of series connected diodes exactly and this system is relatively expensive in construction and manufacture. Further, since the single voltage divider is supplied with the rectifier output voltage and the battery voltage, there is a mutual interference therebetween even if such compensating circuit is provided.

SUMMARY OF THE INVENTION

An object of the present invention is to provide a voltage regulator for a vehicle mounted generator by which the output voltage of the generator is regulated to a properly set value with an inexpensive circuit construction, even if the connection of the voltage regulator to a charging voltage detection terminal of a battery is broken, so that the battery and other electrical loads of the vehicle are always supplied with the properly set voltage.

According to the present invention, the above object can be achieved by a voltage regulator comprising first detection means for detecting the voltage of the battery, second detection means for detecting the output voltage of the generator, and switching means for switching between the first and second detection means such that, when the first detection means is connected to the battery properly, the field current of the generator is controlled by the first detection means and, when the first detection means is disconnected from the battery for some reason, the field current of the generator is controlled by the second detection means.

With the switching means which operates such that, when the connection between the battery and the first detection means is proper, the first detection means is in circuit to control the field current of the generator, while making the second detection means ineffective, and, when the connection is broken, the second detection means is made effective to control the field current of the generator, there is no mutual interference between the voltages detected by the first and second detection means, and therefore it is possible to set the detecting voltage values thereof equal or at least substantially equal to each other.

DETAILED DESCRIPTION OF THE PREFERRED EMBODIMENTS

Figure 1:
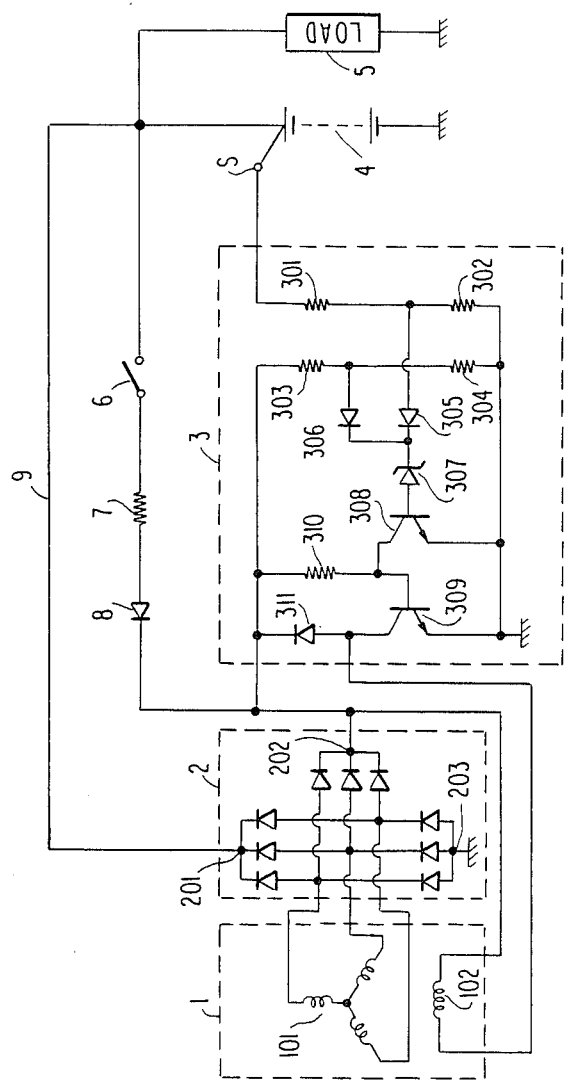
FIG. 1 is a circuit diagram of a conventional control device of a vehicle mounted generator.
Figure 2:
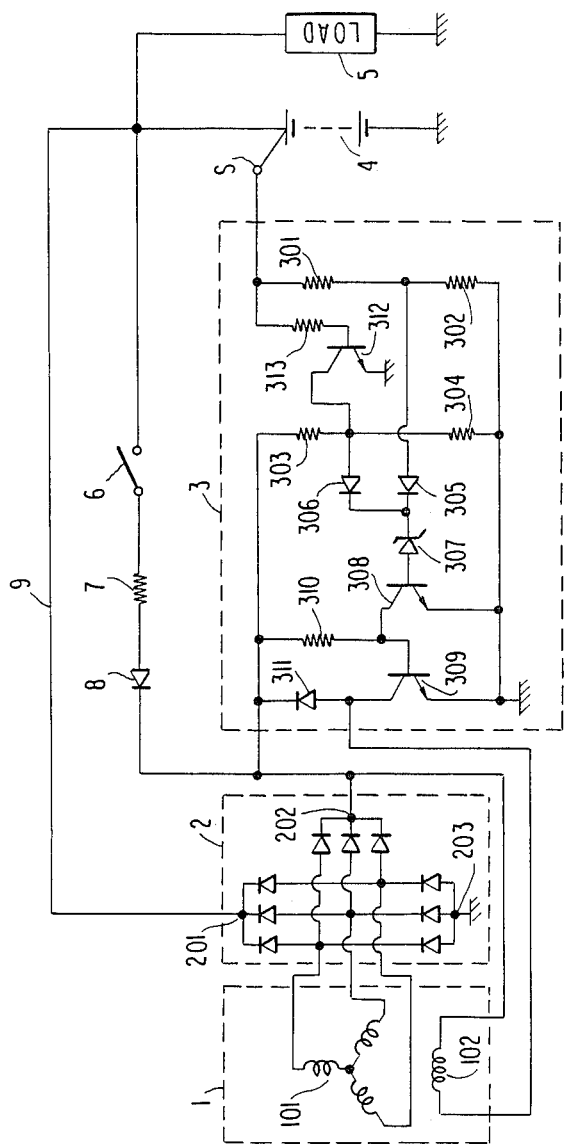
FIG. 2 is a circuit diagram of an embodiment of the present invention.

In FIG. 2, a transistor 312 has a collector connected to the junction between series-connected resistors 303 and 304, to ground the junction when turned on, and a base connected through a resistor 313 to the battery voltage detecting point S. The transistor 312 and its base resistor 313 constitute a switching means for selectively enabling or disabling the means for detecting the output voltage of the generator. Other portions of the circuit construction of this control device are the same as those of the conventional device shown in FIG. 1 and therefore will not be described.

In operation, when the connection of the voltage regulater 3 to the terminal S of the battery is intact during the normal operation of the generator, a base current flows from the battery 4 through the base resistor 313 to the base of the transistor 312 to turn the latter on to thereby short-circuit or ground the junction of the voltage divider constituted by the resistors 303 and 304 through the collector-emitter circuit of the transistor 312. With the junction point being grounded, the on-off operation of the Zener diode 307 depends only upon the potential at the junction point between series-connected resistors 301 and 302 which constitute a voltage divider. That is, the voltage detected by the voltage regulator 3 is only the battery voltage, and the voltage regulator 3 renders the charging voltage of the battery and voltages applied to various electrical loads of the vehicle always constant.

When the connection of the voltage regulator 3 to the terminal S of the battery 4 is broken, the potential at the junction between the resistors 301 and 302 becomes zero and, therefore, the operation of the Zener diode 307 is not influenced by the voltage divider 301, 302. Further, the transistor 312 is supplied with no bsse current and is thus turned off. With the transistor 312 being non-conductive, the voltage at the junction between the resistors 303 and 304 is applied to the cathode of the Zener diode 307 to on-off control the latter.

According to this embodiment, the voltage regulator 3 operates in accordance with the detected battery voltage when it is connected to the battery terminal S correctly, and in accordance with the detected output voltage of the generator when the connection to the terminal S is broken. Therefore, the detected voltages do not interfere with each other and, therefore, it is possible to set them to the same or at least substantially the same value. Since the first preset value is equal or substantially equal to the second preset value, the regulation of the output voltage of the generator can be performed with the first preset value which is equal or substantially equal to the second preset value, even when the connection thereof to the battery terminal S is broken, the thereby prevent an over-charging of the battery from occurring.

In the described embodiment, the collector of the transistor 312 is connected directly to the junction between the resistors 303 and 304 so that the potential at the junction is lowered during the normal operation of the unit. However, it is possible to connect the collector indirectly to the junction, as shown in FIG. 3.

Figure 3:
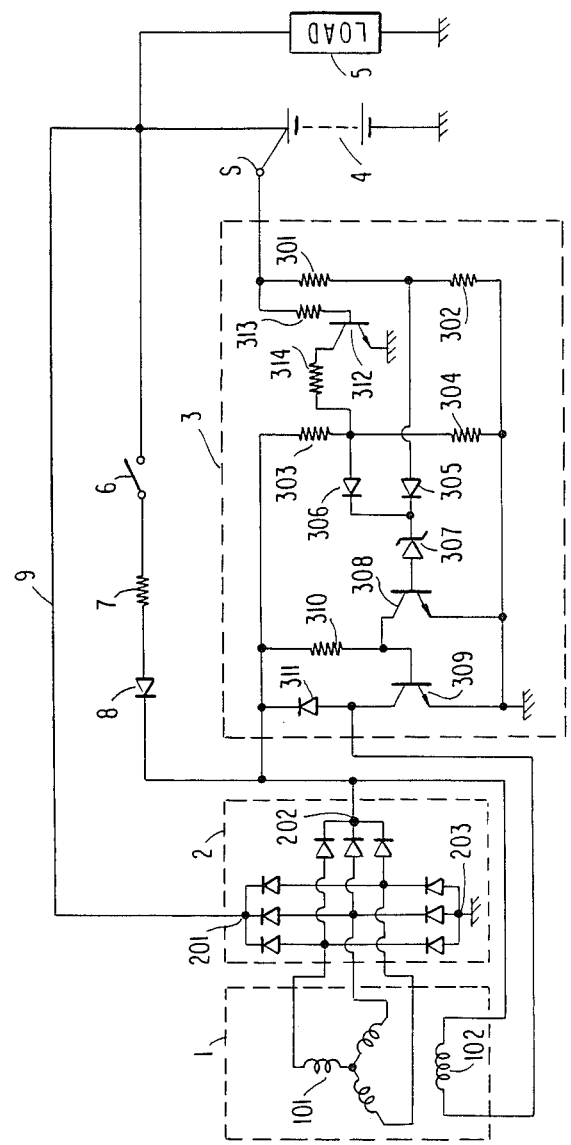
FIG. 3 is a circuit diagram of another embodiment of the present invention.

In FIG. 3 which shows another embodiment of the present invention, the collector of the transistor 312 is connected to the junction point through a resistor 314 so that it is connected to parallel to the resistor 304 of the voltage divider when the transistor 312 is turned on, to change the dividing ratio of the divider.

That is, when the connection of the battery to a main output 201 of the rectifier 2 is broken while the connection of the voltage regulator 3 to the battery terminal S is normal, there is no power supplied from the generator to the battery 4 and so there is no increase of the battery voltage, resulting in no increase of the potential at the junction point of the divider 301, 302, with the transistor 312 being held conductive. If there were no resistor 314 under these conditions, the junction point of the divider 303, 304 would be grounded through the transistor 312. Therefore, the potential at the junction would not increase and thus the voltage regulator 3 would become out of control, so that the output voltage of the generator would increase abnormally and flow a large current through the field winding, leading to the damage of the transistor 309.

On the other hand, with the resistor 314 in place, the potential at the junction point of the divider 303 and 304 is determined by the ratio of resistance of the parallel-connected resistors 304 and 314 to that of the resistors 303, upon which the Zener diode 307 is on-off controlled to make the output voltage of the generator a certain constant value low enough to prevent the damage of the transistor 309.

In the second embodiment shown in FIG. 3, it is possible to appropriately regulate the output of the regulator 3 when the connection of the regulator 3 to the detection point S of the battery is broken, so that the output voltage of the generator 1 can be appropriately regulated. Further, even if the connection to the main output terminal 201 is also broken, the regulator can be protected appropriately against a high output voltage of the generator.

As mentioned hereinbefore, the present invention comprises a first detection means for detecting the battery voltage, which controls the field current of the generator when the connection of the voltage regulator to the terminal S is normal, a second detection means for detecting the output voltage of the generator, which controls the field current when the terminal S is disconnected, and means responsive to the condition of the connection terminal for selectively making either of the first and second detection means operable. Therefore, there is no interference between the detected voltages of both means, and thus it is possible to make the regulation voltage values for both means equal or substantially equal to each other. Consequently, the charging voltage of the battery can be regulated to a constant value by means of the first detection means during normal operation and, even if the connection S is broken, the overcharging of the battery is prevented.

What is claimed is:

1. A voltage regulator for a vehicle mounted a.c. generator (1) having a field winding (102) and equipped with a rectifier (2), comprising: first discrete detection means (301, 302) connected to a battery (4) mounted on said vehicle for detecting a voltage thereof, second discrete detection means (303, 304) connected to said rectifier for detecting an output voltage thereof, switching means (307–309) responsive to an output of either said first or said second discrete detection means for on-off controlling the current flow through the field winding of said generator, and selector means (312) for disabling said second discrete detection means such that said switching means is exclusively controlled by the output of said first discrete detection means when the connection between said first discrete detection means and said battery is intact, and for enabling said second discrete detection means in response to an interruption of the connection between the first discrete detection means and the battery such that the switching means is exclusively controlled by the output of the second discrete detection means, wherein threshold control voltages of the first and second discrete detection means are independent of each other, and are established at substantially equal values.

2. The voltage regulator as claimed in claim 1, wherein said first detection means comprises a first voltage divider including a first pair of series connected resistors (301, 302), said second detection means comprises a second voltage divider including a second pair of series connected resistors (303, 304), and said switching means comprises a transistor, and wherein said selector means comprises a transistor (312) connected between a positive terminal of said battery and a junction of said resistors of said second voltage divider.

3. The voltage regulator as claimed in claim 2, wherein said transistor of said selector means has a base connected through a base resistor (313) to said positive terminal of said battery, an emitter grounded, and a collector connected to said junction of said resistors of said second detection means.

4. The voltage regulator as claimed in claim 3, wherein said selector means further comprises a resistor (314) connected between said junction of said resistors of said second voltage divider and said collector of said selector means transistor.

* * * * *